(12) United States Patent
Fukasawa et al.

(10) Patent No.: US 8,845,156 B2
(45) Date of Patent: Sep. 30, 2014

(54) VEHICLE LAMP

(75) Inventors: Yosuke Fukasawa, Ota (JP); Yasushi Kawaji, Ota (JP); Hitoshi Kurihara, Ashikaga (JP); Tatsuya Sugamoto, Okazaki (JP)

(73) Assignee: Mitsuba Corporation, Kiryu-shi (JP)

( * ) Notice: Subject to any disclaimer, the term of this patent is extended or adjusted under 35 U.S.C. 154(b) by 248 days.

(21) Appl. No.: 12/450,038

(22) PCT Filed: Mar. 7, 2008

(86) PCT No.: PCT/JP2008/000488
§ 371 (c)(1),
(2), (4) Date: Sep. 16, 2009

(87) PCT Pub. No.: WO2008/129766
PCT Pub. Date: Oct. 30, 2008

(65) Prior Publication Data
US 2010/0091508 A1 Apr. 15, 2010

(30) Foreign Application Priority Data
Mar. 12, 2007 (JP) ................. 2007-061391

(51) Int. Cl.
*F21V 9/00* (2006.01)
*B60R 1/12* (2006.01)
*B60Q 1/26* (2006.01)
*F21V 8/00* (2006.01)

(52) U.S. Cl.
CPC ............. *B60R 1/1207* (2013.01); *G02B 6/002* (2013.01); *B60Q 1/2665* (2013.01)
USPC ........... 362/511; 362/459; 362/487; 362/494; 362/498; 362/509; 362/543; 362/544; 362/545; 362/613; 362/140; 362/141

(58) Field of Classification Search
USPC ......... 362/459, 487, 494, 498, 509, 511, 543, 362/544, 545, 613, 140, 141
See application file for complete search history.

(56) References Cited

U.S. PATENT DOCUMENTS

| 6,315,437 | B1 * | 11/2001 | Katz et al. ..................... 362/494 |
| 6,637,917 | B2 * | 10/2003 | Schwanz et al. ............. 362/487 |
| 6,769,798 | B2 * | 8/2004 | Mishimagi ..................... 362/522 |
| 6,893,146 | B2 * | 5/2005 | Fiegler et al. ................. 362/494 |
| 7,140,757 | B2 * | 11/2006 | Sakai ............................. 362/494 |
| 7,357,549 | B2 * | 4/2008 | Gunther ......................... 362/551 |
| 7,540,642 | B2 * | 6/2009 | Takahashi et al. ............ 362/494 |
| 2005/0146886 | A1 * | 7/2005 | Furuya et al. ................. 362/494 |
| 2005/0243568 | A1 * | 11/2005 | Rodriguez Barros et al. ............................ 362/494 |
| 2006/0146555 | A1 * | 7/2006 | Inaba ............................. 362/494 |

FOREIGN PATENT DOCUMENTS

| JP | U-62-121141 | 7/1987 |
| JP | U-3-107349 | 11/1991 |
| JP | A-2000-103287 | 4/2000 |
| JP | A-2001-180377 | 7/2001 |
| JP | A-2003-132709 | 5/2003 |

* cited by examiner

*Primary Examiner* — Thomas M Sember
*Assistant Examiner* — Tsion Tumebo
(74) *Attorney, Agent, or Firm* — Oliff PLC

(57) ABSTRACT

A vehicle lamp includes a long solid-core shaped light guide; a first light source that irradiates an end portion of the long solid-core shaped light guide in a longitudinal direction such that light is radiated long from an end side of the vehicle lamp toward another end side of the vehicle lamp; and a second light source that irradiates the another end side of the vehicle lamp to a lateral outer side.

9 Claims, 3 Drawing Sheets

VEHICLE LAMP

CROSS-REFERENCE TO RELATED APPLICATION

This application is the U.S. National Phase of PCT/JP2008/000488, filed Mar. 7, 2008, which claims priority from Japanese Patent Application No. 2007-061391, filed Mar. 12, 2007, the entire disclosure of which is incorporated herein by reference hereto.

BACKGROUND

The present disclosure relates to a vehicle lamp for a vehicle such as an automobile.

There exists a vehicle lamp in which a turn lamp (direction indicator) is attached integrally to a door mirror mounted on a door of a vehicle (vehicle body). The turn lamp lights together with turn lamps provided at the front and rear of a vehicle notify people around the vehicle about the driving intention of a driver. Light emitting diodes (LEDs) are sometimes used to light the turn lamps.

A light source and a long solid-core light guide (optical fiber) are provided to a lower part of the door mirror. The light source irradiates an end portion of the solid-core light guide (optical fiber) in a longitudinal direction such that light is radiated from an entire length of the light guide for design properties as well as for excellence in visibility (see Japanese published Unexamined Japanese Patent Application No. JP-A-2000-103287, for example).

SUMMARY

The above-described conventional lamp uses LEDs that are excellent in durability to irradiate the light guide as the light sources. Because the LEDs are also high in directivity, a radiational direction of a LED light deviates with respect to the light guide if the end of the long light guide in the longitudinal direction is irradiated by a LED without accurately aligning the LED and the light guide. If that is the case, the radiated light may attenuate so as not to reach another end side portion of the long light guide. In the conventional door mirror, such an end side in the longitudinal direction of the light guide is positioned on a lateral outer side of the vehicle body. Such a portion does not light sufficiently if the LED's radiational direction deviates and the light does not reach the end side of the light guide. Accordingly, legal requirements (legal standard) for lighting intensity may not be satisfied. The present disclosure intends to solve such problems and achieve various advantages.

The disclosure according to an exemplary aspect provides a vehicle lamp that includes a long solid-core shaped light guide; a first light source that irradiates an end portion of the long solid-core shaped light guide in a longitudinal direction such that light is radiated long from an end side of the vehicle lamp toward another end side of the vehicle lamp; and a second light source that irradiates the another end side of the vehicle lamp to a lateral outer side.

According to the exemplary aspect, there is provided a vehicle lamp that reliably achieves the legal standard as a turn lamp.

BRIEF DESCRIPTION OF THE DRAWINGS

Various exemplary aspects will be described with reference to the drawings, wherein.

DETAILED DESCRIPTION OF EMBODIMENTS

An embodiment of the present disclosure will be described with reference to the drawings.

Figure 1:
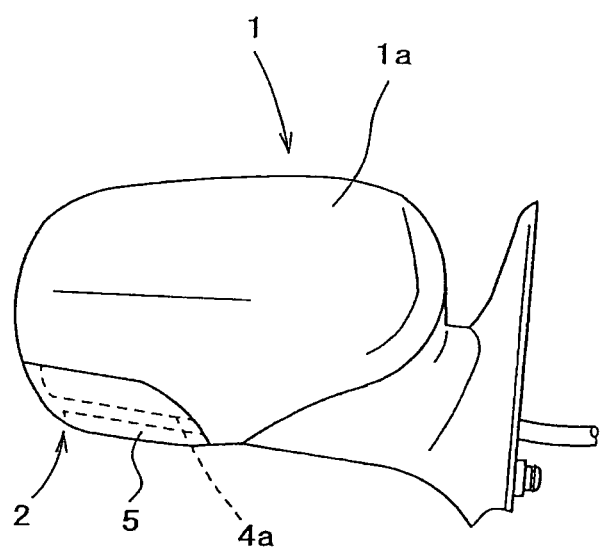
FIG. 1 is an entire perspective view of a door mirror.

A door mirror 1 is mounted on a door of a vehicle (see FIG. 1). An opening is formed at a portion (not shown) that faces rearward (vehicle rear side) of a body 1a of the door mirror 1. A rearview mirror (not shown) is adjustably positioned and fit into the opening. A portion of the body 1a that faces forward is formed to bulge forward. A turn lamp 2 of the present disclosure, which is an example of a vehicle lamp, is incorporated into a lower portion of the bulging portion.

Although the door mirror 1 is symmetrically provided to both left and right door bodies of the vehicle, the door mirror 1 at a right side of the vehicle will be described as shown in FIG. 1. A description of another door mirror 1 on a left side of the vehicle will be omitted.

The turn lamp 2, which is incorporated into the door mirror 1, is incorporated as an assembly into the lower portion of the forward bulging portion of the body 1a. The turn lamp 2 includes a base housing 3; an inner housing 4, both of which are housed inside the body 1a; and a lens part 5 that covers a front portion of the inner housing 4 and is exposed outside with an outer peripheral surface of the body 1a.

Figure 2:
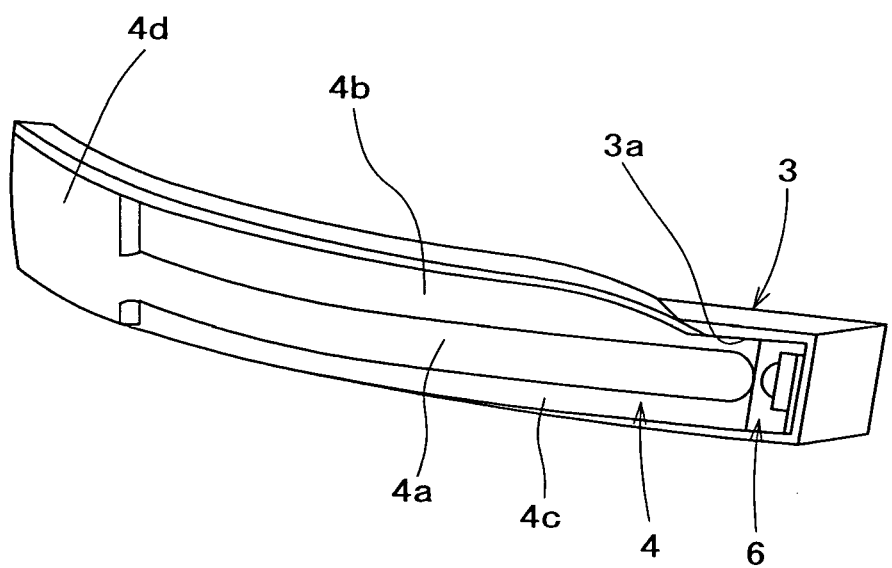
FIG. 2 is a perspective view showing a state where a lens part is removed from a turn lamp of the door mirror.
Figure 3:
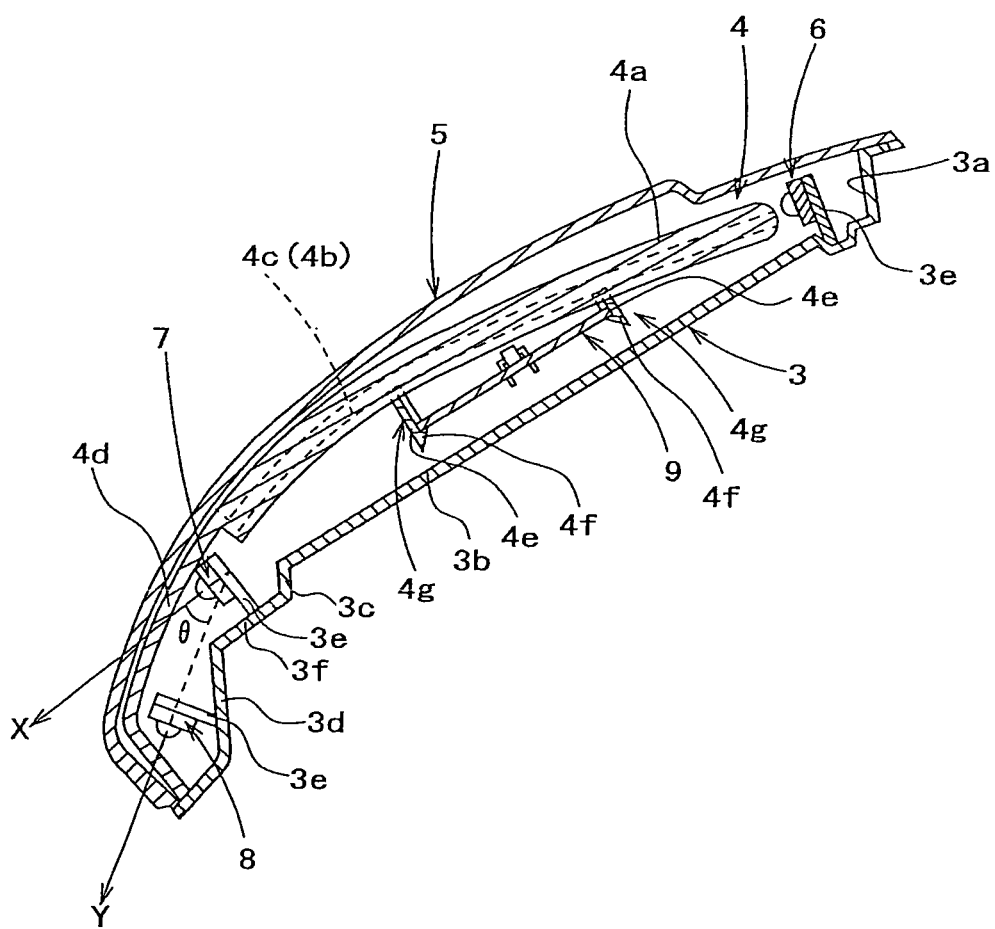
FIG. 3 is a cross sectional view of the turn lamp.

The base housing 3 is integrally molded from a non-translucent resin material and formed laterally long so as to be installed into an interior of the lower portion of the door mirror body 1a. A right end portion of the base housing 3 (left side when viewing FIGS. 1-3) is a lateral outer side of the vehicle body and bent rearward. The base housing 3 has a recess 3a that is opened from a front portion to a right portion and closed as the inner housing 4 is incorporated from the front of the recess 3a.

A bottom piece 3b of the recess 3a of the base housing 3 is formed to be plane-shaped. A right end portion of the bottom piece 3b is bent rearward because first and second stepped portions 3c and 3d are formed on the right end portion.

The inner housing 4 is integrally molded using a translucent resin material and formed to be curved and laterally long. In the inner housing 4, a columnar light guide 4a is formed to be opposed to the front opening portion of the base housing 3 and extend rightward from a left end side. A pair of upper and lower flanges 4b and 4c are integrally formed to extend vertically from upper and lower edges of the light guide 4a. An inner lens body 4d is integrally formed at a portion that is a right end portion of the inner housing 4, positioned at the lateral outer side of the vehicle body and opposed to the rightward opening portion of the base housing 3. The inner lens body 4d also extends from right edges of the light guide 4a and the flanges 4b and 4c.

First, second, and third light emitting diodes (LEDs) 6, 7 and 8 are light sources of the turn lamp 2, general-purpose light emitting diodes and fixed and supported by support members 3e that are formed to stand on the bottom piece 3b.

The first LED 6 is an example of a first light source of the present disclosure and is disposed to face an end portion of the light guide 4a of the inner housing 4 in a longitudinal direction at a side where the inner lens body 4d of the inner housing 4 is not formed, that is, a lateral inner side of a vehicle body. The first LED 6 is also fixed and supported by a support member 3e that is disposed at an end side of the bottom piece 3b. Lighting the first LED 6 causes the light guide 4a to radiate a long light.

The second and third LEDs 7 and 8 are examples of a second light source of the present disclosure and are disposed at a side opposite in a longitudinal direction to the first LED 6. The second and third LEDs 7 and 8 irradiate the inner lens body 4d of the inner housing 4 that is positioned on a lateral outer side of the vehicle body. The second LED 7 is fixed and supported by a support member 3e that is disposed at a tilt piece 3f between the first and second stepped portions 3c and 3d. The third LED 8 is fixed and supported by a support member 3e disposed at the second stepped portion 3d. Lighting the second and third LEDs 7 and 8 causes a radiating light from a portion of the inner lens body 4d. More specifically, the second and third LEDs 7 and 8 are positioned to possess a different irradiation angle with respect to the inner lens body 4d. The third LED 8 is disposed to emit a radiation light Y with an angle θ with respect to a radiation direction X of the second LED 7. Accordingly, light is widely radiated through the inner lens body 4d with fewer light sources, with a resultant reliable satisfaction of legally required (standard) lighting intensity and improved visibility to vehicles and pedestrians around.

A substrate 9 to which the LEDs 6, 7 and 8 are electrically connected is supported integrally by latching claws 4g and housed between the inner housing 4 and the base housing 3. The latching claws 4g are formed of a pair of basal portions 4e in a longitudinal direction that project from the inner housing 4 toward a side of the base housing 3; and claw portions 4f that are formed on projecting tip end portions of the basal portions 4e.

The first, second and third LEDs 6, 7 and 8 are fixed to the base housing 3. The inner housing 4 is incorporated into the recess 3a of the base housing 3. The substrate 9, to which the first, second and third LEDs 6, 7 and 8 are connected using connecting members such as lead wires, is latched on the latching claws 4g of the inner housing 4. The lens part 5 covers a front side of the inner housing 4. The turn lamp 2 is thus formed (united) and incorporated into the body 1a of the door mirror 1.

In addition, a surface at a side of the base housing 3 that defines an inner side surface of the inner housing 4 is formed to be a non-smooth surface by texturing, for example. Accordingly, a light reflection is diffused through the light guide 4a and the inner lens body 4d irradiated by the first, second, and third LEDs 6, 7 and 8. The turn lamp 2 can increase its visibility because a light incident upon the light guide 4a and the inner lens body 4d can be diffused and radiated. Further, an efficient radiation is possible through the light guide 4a because the upper and lower flanges 4b and 4c function as light isolators. Furthermore, a rear of the inner housing 4 is invisible from a side of the lens 5 and therefore, the substrate 9, which is fixed and supported at the rear of the inner housing 4, is invisible from outside. Accordingly, the turn lamp 2 realizes design properties.

The inner housing 4 may be integrally molded by a two-color molding in which a light guide and an inner lens body are formed from a translucent resin material while flanges are formed from a non-translucent resin material. Rear surfaces of the light guide and the inner lens body may be formed to be non-smooth surfaces. Similar to the above-mentioned configuration, a substrate is covered with the flanges so as to be invisible from outside.

According to the present embodiment configured as described above, the turn lamp 2, which is incorporated into the door mirror 1, is excellent in visibility from the front of the vehicle and realizes design properties because, on a front portion of the vehicle, light is radiated to be laterally long through the light guide 4a that is formed integrally with the inner housing 4. Further, the turn lamp 2 is provided with not only the first light emitting diode as the first light source upon which a light is incident through an end side portion of the light guide 4a but also the second and third LEDs 7 and 8 as the second light source that irradiates the inner lens body 4d that is formed on another end side portion of the light guide 4a. Accordingly, light can also be reliably radiated from the end portion in the longitudinal direction of the turn lamp 2, that is, the lateral outer side of the vehicle body. An insufficient lighting intensity according to the legal standard as the turn lamp 2 can be reliably prevented even if installation deteriorates at the first LED 6.

In addition, the second and third LEDs 7 and 8 as the second light source are provided to irradiate the inner lens body 4d at different irradiation angles. Accordingly, a legal required lighting intensity portion on the lateral outer side of the vehicle body can be further increased with a smaller number of light sources.

The present disclosure is useful for a turn lamp 2 to be provided in a vehicle such as an automobile. The turn lamp 2 is excellent in visibility from a front side of the vehicle by a light radiated from the light guide 4a while maximizing design properties. The turn lamp 2 further achieves an increased lighting intensity and visibility because both the first LED 6 as the first light source and the second and third LEDs 7 and 8 as the second light source are disposed.

What is claimed is:

1. A turn lamp incorporated into a door mirror, the turn lamp comprising:
   a base housing housed inside a body of the door mirror and supporting a first light source and a second light source;
   an inner housing formed to be curved in a laterally long direction and incorporated from outside of the body so as to be opposite to the base housing;
   a curved and laterally long solid-core shaped light guide formed at a base housing opposing side of the inner housing;
   a pair of upper and lower flanges extending vertically from upper and lower edges of the light guide;
   an inner lens body integrally formed as a one-piece unitary structure with a lateral outer end side of the light guide and the flanges;
   the first light source disposed inside a lateral inner end side of the light guide, the first light source irradiates the light guide from the lateral inner end side toward the lateral outer end side;
   the second light source disposed outside the lateral outer end side of the light guide, the second light source irradiates the inner lens body toward a lateral outer side of the inner lens body;
   a substrate electrically connected to the first light source and the second light source and positioned between the light guide and the base housing that is opposite to the light guide; and
   a lens part that covers the light guide and the inner lens body, wherein:
   the irradiation of the first light source extends to the inner lens body from the lateral inner end side of the light guide through the lateral outer end side of the light guide,
   the second light source is positioned to irradiate toward the lateral outer side of the inner lens body across the inner lens body and the lens part,
   the second light source includes a plurality of light sources that are spaced from each other in a lateral direction to each other, an outer light of the plurality of light sources included in the second light source is positioned such that a radiation direction of the outer light has an angle with respect to a radiation direction of an inner light of the plurality of light sources included in the second light source when the outer light and the inner light are operating, both the outer light and the inner light are positioned such that both the outer light and the inner light irradiate toward the lateral outer side of the inner lens body when both the outer light and the inner light are operating, and the outer light and the inner light are spaced in the lateral direction from each other, the substrate is supported integrally at an inner side of the light guide by latching claws formed on a projecting tip end portion of a basal portion projecting from the inner housing toward a side of the base housing, and the pair of upper and lower flanges function as light isolators.

2. The turn lamp according to claim 1, wherein:
the first light source irradiates the light guide in a longitudinal direction at the lateral inner end side of the light guide where the lens body is not formed.

3. The turn lamp according to claim 1, wherein the plurality of light sources included in the second light source are positioned at different angles.

4. A turn lamp comprising:
a base housing supporting a first light source and a second light source;
an inner housing formed to be curved in a laterally long direction and incorporated so as to be opposite to the base housing, the inner housing includes:
  a curved and columnar light guide formed at a base housing opposing side of the inner housing,
  a pair of upper and lower flanges extending vertically from upper and lower edges of the light guide, and
  an inner lens body integrally formed as a one-piece unitary structure with a lateral outer end side of the light guide and the flanges;
the first light source disposed inside a lateral inner end side of the light guide, the first light source irradiates the light guide from the lateral inner end side toward the lateral outer end side;
the second light source disposed outside the lateral outer end side of the light guide, the second light source irradiates the inner lens body toward a lateral outer side of the inner lens body;
a substrate electrically connected to the first light source and the second light source and positioned between the light guide and the base housing that is opposite to the light guide; and
a lens part that covers the light guide and the inner lens body, wherein:
the irradiation of the first light source extends to the inner lens body from the lateral inner end side of the light guide through the lateral outer end side of the light guide,
the second light source is positioned to irradiate toward the lateral outer side of the inner lens body across the inner lens body and the lens part,
the second light source includes a plurality of light sources that are spaced from each other in a lateral direction to each other,
an outer light of the plurality of light sources included in the second light source is positioned such that a radiation direction of the outer light has an angle with respect to a radiation direction of an inner light of the plurality of light sources included in the second light source when the outer light and the inner light are operating,
both the outer light and the inner light are positioned such that both the outer light and the inner light irradiate toward the lateral outer side of the inner lens body when both the outer light and the inner light are operating, and the outer light and the inner light are spaced in the lateral direction from each other,
the substrate is integrally supported by latching claws formed on a projecting tip end portion of a basal portion projecting from the inner housing toward a side of the base housing, and
the pair of upper and lower flanges function as light isolators.

5. The turn lamp according to claim 4, wherein the plurality of light sources included in the second light source are positioned at different angles with respect to the inner lens body.

6. The turn lamp according to claim 4, wherein the inner housing is incorporated into a recess of the base housing.

7. A door mirror comprising:
a body; and
the turn lamp according to claim 4 incorporated into the body.

8. The turn lamp according to claim 1, wherein the flanges are formed from a translucent resin material.

9. The turn lamp according to claim 4, wherein the flanges are formed from a translucent resin material.

* * * * *